United States Patent
Ingram

(10) Patent No.: US 6,481,041 B1
(45) Date of Patent: Nov. 19, 2002

(54) TOOL HAVING A SCRAPER AND A PIVOTALLY-MOUNTED BRUSH FOR CLEANING AND SWEEPING

(75) Inventor: Vicki Ingram, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 19 days.

(21) Appl. No.: 09/658,955

(22) Filed: Sep. 11, 2000

(51) Int. Cl.[7] .............................. A46B 7/02; A47L 13/12
(52) U.S. Cl. ......................... 15/111; 15/144.1; 15/172
(58) Field of Search ................... 15/111, 144.1, 15/172

(56) References Cited

U.S. PATENT DOCUMENTS

| | | | | |
|---|---|---|---|---|
| 412,002 | A | * 10/1889 | Schroen | 15/111 X |
| 1,439,913 | A | 12/1922 | Saxe | 15/172 |
| 1,728,956 | A | * 9/1929 | Darmitzel | 15/111 X |
| 1,859,129 | A | * 5/1932 | Costenbader | 15/172 |
| 2,047,613 | A | 7/1936 | Brown | 403/97 |
| 2,799,037 | A | 7/1957 | Grogan | 15/172 |
| 3,051,975 | A | 9/1962 | Schwartz | 15/105 |
| 3,619,846 | A | 11/1971 | Krusche et al. | 15/172 |
| 4,302,862 | A | 12/1981 | Machacek et al. | 15/117 |
| 4,403,623 | A | * 9/1983 | Mark | 15/172 X |
| 4,673,307 | A | 6/1987 | Prestele et al. | 401/289 |
| 4,731,896 | A | * 3/1988 | De La Tour | 15/172 X |
| 4,908,900 | A | 3/1990 | Mclaughlin et al. | 15/111 |
| 5,324,129 | A | 6/1994 | Root | 401/195 |
| 5,581,838 | A | * 12/1996 | Rocco | 15/172 X |
| 5,794,302 | A | * 8/1998 | Lin | 15/172 |
| 5,960,509 | A | * 10/1999 | Wu | 15/172 X |
| D422,146 | S | 4/2000 | Sneed et al. | D4/118 |
| 6,128,800 | A | * 10/2000 | Vosbikian | 15/172 |

FOREIGN PATENT DOCUMENTS

| | | | | |
|---|---|---|---|---|
| CH | 243821 | * | 1/1947 | 15/144.1 |
| DE | 534114 | * | 9/1931 | 15/172 |

* cited by examiner

*Primary Examiner*—Mark Spisich
(74) *Attorney, Agent, or Firm*—Hovey Williams LLP

(57) ABSTRACT

A tool (10) for removing ice, snow, and general debris from vehicles. The tool (10) broadly comprises an elongated handle (14) having opposed first and second ends, a brush head (12) pivotally coupled to the first end of the handle (14) by a pivot mechanism (16), and a scraper (18) attached to the second end of the handle (14). The pivot mechanism (16) comprises a spring-loaded knob (46) which may be easily actuated with one hand and whose large proportions make operation by gloved hands convenient. To pivot the brush (12), an operator merely depresses and turns the knob (46) of the pivoting mechanism (16). Two pair of detents (21), arranged 90° to one another, lock the brush (12) into a first position, in which the brush is aligned with the handle (14) and may be used with a sweeping motion, or a second position, in which the brush (12) is perpendicular to the handle (14) and may be used with a pushing or pulling motion.

4 Claims, 2 Drawing Sheets

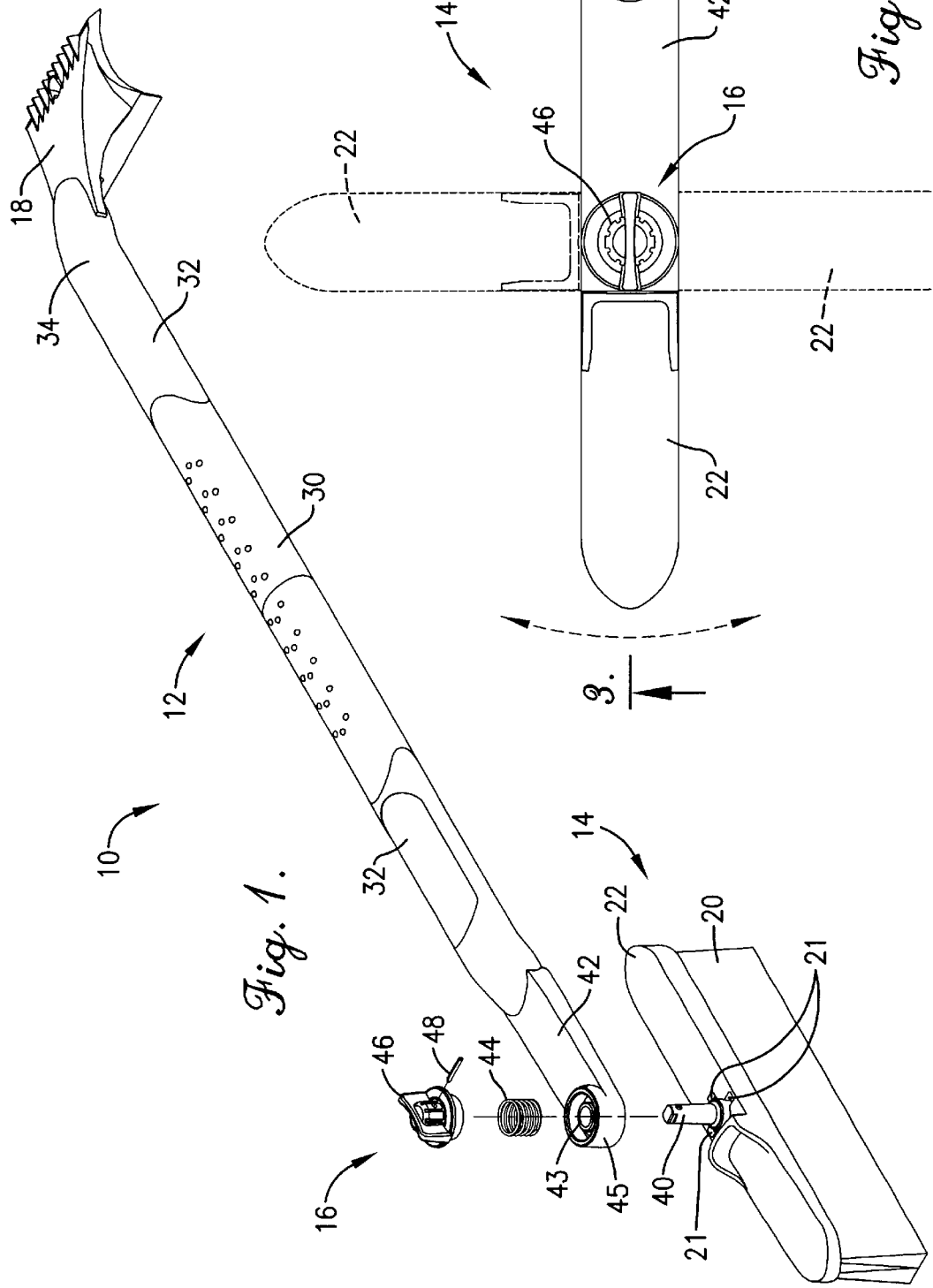

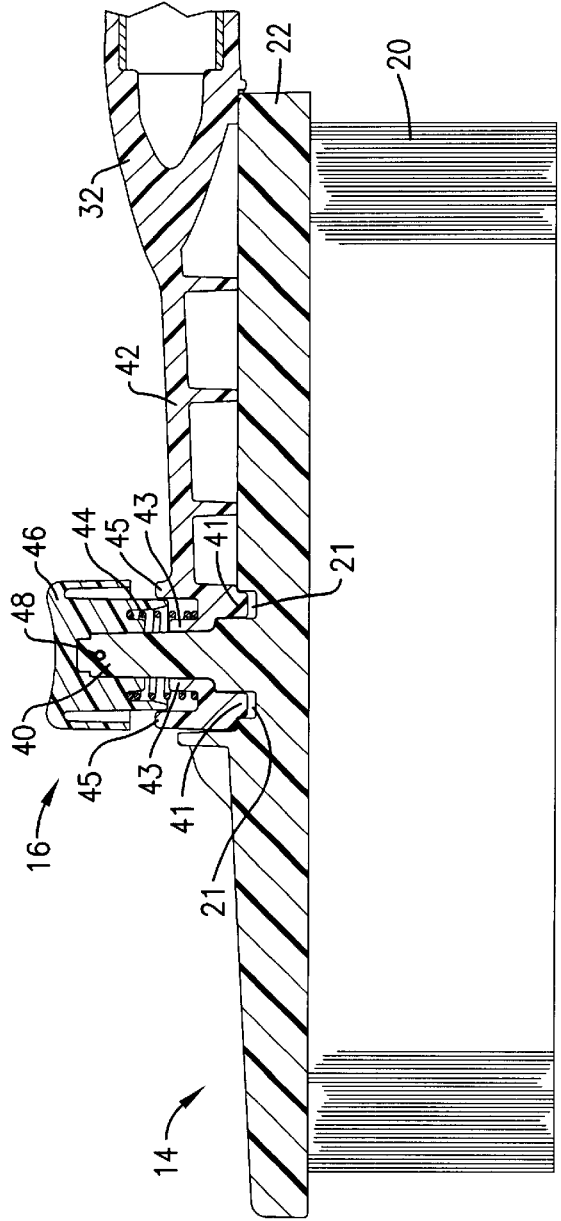
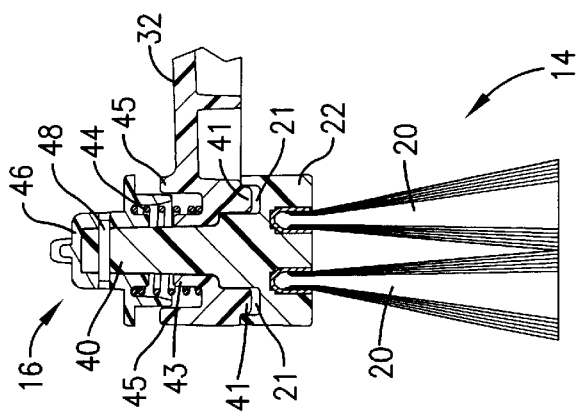
Fig. 3.
Fig. 4.
Fig. 5.

TOOL HAVING A SCRAPER AND A PIVOTALLY-MOUNTED BRUSH FOR CLEANING AND SWEEPING

RELATED APPLICATIONS

This application is related to a design patent application entitled A Design for a Tool Having a Scraper and a Pivotally-Mounted Brush, Ser. No. 29/128,689, filed Aug. 29, 2000, now U.S. Pat. No. Des. 451,287.

BACKGROUND OF THE INVENTION

1. FIeld of the Invention

The present invention relates to devices and apparatuses for removing ice, snow, and general debris from vehicles. More particularly, the invention relates to tools for brushing away ice and snow using pivotally-mounted brushes which may be positioned at various angles for ease and efficiency of use.

2. Description of the Prior Art

Snowbrushes and brooms are commonly used to remove ice, snow, and general debris from vehicles. These tools typically combine a snowbrush and an ice scraper fitted at opposite ends of an elongated handle.

The odd and varied angles presented to a person while cleaning the various glass surfaces of a vehicle make a positionable brush highly desirable. Under certain circumstances, where it is desirable to sweep with an up-and-down motion, the brush is most conveniently positioned in-line with the handle. Under other circumstances, where a push-and-pull motion is desirable, the brush is most conveniently positioned perpendicular to the handle.

Numerous pivoting-head brush designs are known in the art. Most are designed for a specific purpose and are unsuitable for other uses. The majority of these designs either require two hands to operate the pivot action, or have elaborate internal actuating mechanisms, internal conduits or reservoirs for delivering application specific materials, or complex support structures. One design in particular requires that the brush be completely removed from the handle and then reattached at the desired angle. Though well-designed for their particular purposes (e.g. dental hygiene, washing and scrubbing, indoor floor sweeping, etc.), all existing designs are either too complex, too difficult or unwieldy to operate with gloved hands, too expensive, or too small for the purposes of snow and ice removal.

SUMMARY OF THE INVENTION

The tool of the present invention includes novel features which make the removal of snow and ice easier and more efficient. The tool comprises a brush pivotally mounted in a novel manner to a handle. The pivot mechanism is actuated by a large knob which may be easily operated with one hand and whose large proportions are extremely advantageous to an operator wearing gloves. To pivot the brush, an operator merely depresses and turns the knob of the pivoting mechanism. Two pairs of detents, arranged 90° to one another, lock the brush into either a first or second position. In the first position, the brush is aligned with the handle and may be used with a sweeping motion, which may be desirable for sweeping small amounts of snow or ice from the side windows of a vehicle. In the second position, the brush is perpendicular to the handle and may be used with a push-broom-like pushing or pulling motion, which may be desirable for removing large amounts of snow or ice from the front and back windows of a vehicle. Conveniently attached to the opposite end of the tool is an ice scraper.

This combination of ice scraper and pivoting snow brush makes the present invention convenient to carry and economical to own; the pivoting brush makes it efficient to use; and the unique, user-friendly pivot mechanism makes it easy to operate. These and other important aspects of the present invention are more fully described in the section entitled DETAILED DESCRIPTION, below.

BRIEF DESCRIPTION OF THE DRAWINGS

A preferred embodiment of the present invention is described in detail below with reference to the attached drawing figures, wherein:

FIG. 1 is an exploded isometric view of the present invention.

FIG. 2 is a fragmentary top plan of the brush-end of the present invention, with the brush shown rotated in broken lines.

FIG. 3 is a fragmentary lengthwise sectional view of the brush-end taken along lines 3—3 shown in FIG. 2, and illustrating the locked pivoting mechanism of the present invention.

FIG. 4 is a fragmentary lengthwise sectional view of the brush-end taken along lines 3—3 shown in FIG. 2, and illustrating the unlocked pivoting mechanism of the present invention.

FIG. 5 is a fragmentary widthwise sectional view of the brush-end, illustrating the pivoted brush-end of the present invention.

DETAILED DESCRIPTION OF THE PREFERRED EMBODIMENT

Referring to FIG. 1, an ice and snow removal tool 10 is illustrated, being constructed in accordance with a preferred embodiment of the present invention and therefore well-suited for removing ice, snow, and general debris from vehicles. The tool 10 broadly comprises an elongated handle 12 having opposed first and second ends, a brush head 14 pivotally coupled to the first end of the handle 12 by a pivot mechanism 16, and a scraper 18 attached to the second end of the handle 12.

The handle 12 provides a connection between the brush head 14 and scraper 18, and control of the tool as a whole. The handle 12 comprises a grip portion 30 and a handle structure 32. The grip portion 32 is comprised of a non-slip material, preferably having protrusions that facilitate grip, and is located approximately midway along the handle structure 32.

The handle structure 32 is substantially cylindrical, of a diameter suitable for a gloved grip, and of a length sufficient to allow a user to reach across a car windshield. The handle structure 32 includes a scraper attachment end 34 and a brush head attachment end 42. The brush head attachment end 42 is located at the first end of the handle 12 and provides an attachment point for the brush head 14 and pivoting mechanism 16. The brush head attachment end 42 comprises inner and outer cylinders 43,45, the axes of which are substantially perpendicular to that of the cylinder forming the handle 12. The inner cylinder 43 rotatably receives the pivot shaft 40 of the mounting structure 22 of the brush-head 12, as described below. The outer cylinder 45 protects the pivot mechanism. Four lugs 41, spaced 90° apart from one another, extend perpendicularly from the bottom of the outer cylinder 45.

The scraper attachment end 34 is located at the opposite end of the handle structure 32 and is operable to receive and securely hold the scraper 18.

The brush head 14 allows for the sweeping removal of loosened ice, snow, and general debris. The brush head 14 comprises bristles 20 and a mounting structure 22. The bristles 20 are manufactured from material and have a length, density, and stiffness suitable for removing stubborn snow and loose ice without damaging an underlying finish. Preferably, as is illustrated in FIG. 5, two sets of bristles 20 are arranged in parallel rows along the bottom length of the mounting structure 22.

The mounting structure 22 is operable to both secure the bristles 20 and to couple the brush head 14 to the handle 12 and pivot mechanism 16. The bottom of the mounting structure 22 is substantially flat but for two parallel grooves which receive and securely retain the bristles 20. A pivot shaft 40 extends perpendicularly from the top of the mounting structure 22. Four indentations 21, spaced 90° apart from one another and coinciding with the four lugs 41 protruding from the bottom of the outer cylinder 45, are machined into the top of the mounting structure 22 adjacent to and surrounding the pivot shaft 40.

The pivot mechanism 16 is operable to allow the brush to be pivoted relative to the handle 12. The pivot mechanism 16 comprises a spring 44, a knob 46, and a retaining pin 48. The spring 44 surrounds the pivot shaft 40 and seats between the inner and outer cylinders 43,45 of the brush head attachment end 42. The bottom of the knob 46 opens into a cylindrical cavity which receives the free end of the pivot shaft 40. The retaining pin 48 is inserted through the knob 46 and pivot shaft 40 in order to securely couple the two together. Thus, rotation of the knob 46 causes rotation of the pivot shaft 40 within the inner cylinder 43 of the brush head attachment end 42 of the handle 12, which, in turn, causes rotation of the brush head 14.

The scraper 18 allows for the removal of ice or other stubbornly attached material. The scraper 18 is well-known in the art, and attaches to the handle structure 32 at its scraper attachment end 34.

FIGS. 3 and 4 illustrate operation of the present invention. A user desiring to pivot the brush 14 may, while gripping the handle 12, depress the knob 46 and turn it until the brush assumes either its first or second position. FIG. 2 illustrates the two possible brush positions—either perpendicular to or parallel with the handle 12. As shown in FIG. 4, when the knob 46 is depressed, the pivot shaft 40 also depresses, the spring 44 compresses and the lugs 41 of the brush head attachment end 42 retract from the indentations 21 of the mounting structure 22. Rotation of the knob 46, it being securely coupled to the pivot shaft 40 by the retaining pin 48, results in rotation of the brush 14. As shown in FIG. 4, once the desired brush position is reached, the user merely releases the knob 46, thereby allowing the spring 44 to decompress and the lugs 41 to re-engage the indentations 21. The brush 14 is then securely positioned relative to the handle 12.

From the preceding description, it can be seen that the tool of the present invention allows for more efficient, convenient, user-friendly, and economical snow and ice removal. Although the invention has been described with reference to the preferred embodiment illustrated in the attached drawings, it is noted that equivalents may be employed and substitutions made herein without departing from the scope of the invention as recited in the claims.

Furthermore, applications are contemplated for the tool herein described that require only minor modifications to the tool as disclosed. For example, equipped with a different scraper and stronger, shorter bristles, the tool may be useful to painters as a paint scraping and cleaning tool.

Having thus described the preferred embodiment of the invention, what is claimed as new and desired to be protected by Letters Patent includes the following:

1. A tool for removing snow and ice from a vehicle, the tool comprising:

a handle having a central portion, a first end portion, and a second end portion, and a long axis;

a grip attached to the central portion of the handle and presenting a substantially slip-resistant surface;

a brush having bristles of a length, density, size, and material suitable for removing the snow from the vehicle, wherein the bristles are all oriented substantially parallel to a plane;

a pivot mechanism comprising a spring-loaded knob operable to pivotally couple the brush to the first end portion of the handle in such a manner as to allow the brush to be securely positioned by a plurality of detents at various angles relative to the handle by depressing, turning, and releasing the knob, wherein the various angles include first position wherein the plane of the bristles is perpendicular to the long axis of the handle so as to facilitate pushing the snow from the vehicle, and a second position wherein the plane of the bristles is parallel to the long axis of the handle; and an ice scraper secured to the second end portion of the handle and suitable for removing ice from the vehicle.

2. The tool of claim 1, wherein the handle is substantially cylindrical, of a diameter suitable for a gloved grip, and of a length sufficient to allow a user to reach across a car windshield.

3. The tool of claim 1, wherein the grip has protrusions.

4. The tool of claim 1, wherein the bristles are coupled to a flat mounting structure having two parallel grooves for securing two rows of bristles.

* * * * *